United States Patent [19]
Kant

[11] Patent Number: 5,563,874
[45] Date of Patent: Oct. 8, 1996

[54] ERROR MONITORING ALGORITHM FOR BROADBAND SIGNALING

[75] Inventor: Krishna Kant, Marlboro, N.J.

[73] Assignee: Bell Communications Research, Inc., Morristown, N.J.

[21] Appl. No.: 379,388

[22] Filed: Jan. 27, 1995

[51] Int. Cl.$^6$ .................................................. H04J 1/16
[52] U.S. Cl. ..................... 370/13; 370/85.8; 340/825.08
[58] Field of Search ........................... 370/13, 85.7, 85.8, 370/94.1, 94.2, 94.3, 95.1, 95.2, 95.3, 110.1, 100.1, 108, 102, 101, 103, 110.2, 110.3, 112, 60.1, 60, 61, 68.1, 85.3, 85.2, 85.6, 84.17; 375/213, 293, 354, 357, 372; 340/825.08, 825.15, 825.16, 825.2, 825.51, 825.5, 825.52, 825.01, 825.02, 825.03

[56] References Cited

U.S. PATENT DOCUMENTS

| | | | |
|---|---|---|---|
| 4,667,193 | 5/1987 | Cotie et al. | 370/85.8 |
| 5,371,739 | 12/1994 | Knapczyk | 370/85.8 |

OTHER PUBLICATIONS

A. Tannebaum, *Computer Networks*, 2nd Ed., Prentice Hall, 1988, Section 4.4, pp. 228–239.

V. Ramaswami and J. L. Wang, "Analysis of the Link Error Monitoring Protocols in the Common Channel Signaling Network," *IEEE Transactions on Networking*, vol. 1, Nov. 1, 1993, pp. 31–47.

D. C. Schmidt, "Safe and Effective Error Rate Monitors for SS7 Signaling Links", *IEEE Journal of Selected Areas in Communications*, vol. 12, Apr. 1994, pp. 446–455.

TD PL/11–20C Rev1, "BISDN–ATM Adaption Layer–Service Specific Connection Oriented Protocol", S. Quinn (ed.), 1993, pp. 1–90.

*Primary Examiner*—Douglas W. Olms
*Assistant Examiner*—Dang Ton
*Attorney, Agent, or Firm*—Leonard Charles Suchyta; James W. Falk

[57] ABSTRACT

The error performance of an ATM signaling link operating under the service specific connection oriented protocol (SSCOP) is monitored at the transmitting end of the link by attributing a penalty factor at the end of each polling interval. That penalty factor is determined by whether or not any message was retransmitted in the interval, and whether or not any stat messages transmitted by the receiver in response to each poll were received from the receiver within a predetermined number of polling intervals. At the end of a block of N_blk polling intervals, a quality of service (QOS) measure is determined based on the average penalty factor of the block. If the QOS measure is greater than a predetermined threshold, then the link is removed from service. In order to adequately monitor a link with low traffic, the number of stat messages that are are lost within a superblock of N_sup polling intervals is determined and if greater than a predetermined number, the link is removed from service.

20 Claims, 3 Drawing Sheets

ERROR MONITORING ALGORITHM FOR BROADBAND SIGNALING

BACKGROUND OF THE INVENTION

This invention relates to error monitoring of links in digital transmission systems and more particularly, to error monitoring of signaling links in high speed ATM networks.

In telecommunication networks, two types of information must be transmitted between the nodes: (a) user payload (e.g., voice, video, or data); and (b) signaling information to control (e.g., set-up and tear-down) the logical paths carrying the user payload. In the current telephone network, the signaling information is carried by a separate network known as the common channel signaling (CCS) network. In high speed ATM (asynchronous transfer mode) networks, the signaling information is carried on separate virtual circuits in the same physical network. Thus, while a CCS link is a physical link, an ATM signaling link is only a "virtual circuit". In either case, assuring integrity of signaling links is essential for meeting the stringent performance/reliability constraints of the signaling network. This is accomplished by deploying links in pairs, where each member of the pair is on a separate physical path and carries only one-half of the engineered traffic. The two links are constantly monitored for errors, and if either of them experiences a high error rate, its traffic is switched over to its mate.

Error monitoring algorithms are used in CCS networks. Error monitoring in ATM networks, however, is not currently being performed. This is because ATM networks until now have only sought to provide permanent virtual circuits (PVCs), i.e., virtual circuits that are provisioned and then left in place until the subscriber wants them to be removed. No special signaling protocol is necessary to handle PVCs. The next evolution in ATM networks is the provision of switched virtual circuits (SVCs), where the virtual circuits are created and destroyed dynamically as needed. This requires a protocol for exchanging messages necessary to set up and tear down SVCs. Such a protocol, known as SSCOP (service specific connection oriented protocol) has been specified in the ATM Adaptation Layer (AAL) in the control plane (also known as signaling AAL or SAAL). Its standardization is currently underway in the study group COM-XI of ITU-T. The issue of error monitoring for the virtual circuit (a PVC or SVC) running the SSCOP protocol must therefore be addressed.

Since error monitoring algorithms already exist for CCS, it is natural to investigate their use in the ATM context as well. Unfortunately, these prior art algorithms have several weaknesses that make them unsuitable in emerging telecommunication networks. Furthermore, the SSCOP protocol is also significantly different from the basic (i.e., level-2) communication protocol used in CCS so as to make a direct adoption of CCS error monitoring algorithms unsuitable. The CCS protocol and associated error monitoring algorithm is described hereinbelow to allow comparison with the SSCOP protocol and its error monitoring requirement.

The level-2 CCS protocol is the well-known "go back N" protocol (see e.g., A. Tanenbaum, *Computer Networks*, 2nd Ed., Prentice Hall, 1988, section 4.4, pp. 228–239). An arriving message goes into a FIFO (first-in, first-out) transmit buffer and waits its turn for transmission. After transmission, the message is saved in a retransmit buffer. The receiver acknowledges each message either with an ack (positive acknowledgement indicating the that the message was received correctly) or a nack (negative acknowledgement, which indicates that the message was corrupted). On receiving a nack, the corresponding message (and all messages following it in the retransmit buffer) are retransmitted. This ensures that the messages always arrive in proper order on the receive side. Another important characteristic of this protocol is that it transmits filler messages called FISUs (fill-in signal units) when it has no data to transmit. FISUs facilitate error monitoring by ensuring that the link always carries some traffic that can be monitored.

The error monitoring algorithm for 56 Kb/sec links is called SUERM (signal unit error rate monitor). SUERM is a "leaky bucket" algorithm and involves two parameters, denoted D and T. Each time SUERM receives an erroneous message, it increments an error counter $C_s$. If $C_s$ crosses the threshold T, the link is taken out of service and its traffic is diverted to an alternate link. The algorithm is tolerant of occasional errors, however. For this, it decrements $C_s$ after receiving a block of D messages (correct and erroneous ones). It should be noted that SUERM counts FISUs as well, and thus is not significantly affected by the traffic level on the link. The ITU standards provide for one set of fixed values of D and T parameters for all links.

It is clear from this description that the SUERM algorithm will tolerate an error rate of up to approximately 1/D (i.e., when less than one out of every D messages is in error), but not significantly higher. A mathematical analysis of SUERM by V. Ramaswami and J. L Wang in "Analysis of the Link Error Monitoring Protocols in the Common Channel Signalling Network,"*IEEE Transactions on Networking*, Vol. 1, No. 1, 1993, pp. 31–47, shows this behavior more clearly. If X denotes the time to take the link out of service, a plot of E(X) (i.e., average value of X) as a function of bit-error ratio (BER) is a curve having a "knee" when the message error ratio (MER) $q_m$ is 1/D. That is, for $q_m < 1/D$, E(X) increases drastically, and for $q_m > 1/D$, E(X) decreases slowly. This is a very desirable behavior, since it means that the link is taken out of service primarily when the error rate exceeds a threshold. The D parameter determines this threshold. The T parameter determines how sharp the knee is. Ideally, a "square knee" is desired so that the link will never be taken out of service if the error rate stays below the threshold.

In summary, although SUERM is a good algorithm for its application, its D parameter (or the threshold 1/D for the message error ratio) must be chosen properly. Given the message delay requirements, the maximum error rate that one can tolerate can be determined. This is called the sustainable error rate and is denoted as $q_b^*$ (for BER) or $q_m^*$ (for MER). Then $D=1/q_m^*$. It can be shown that the sustainable error rate depends on a number of parameters such as link speed, link length, message size, etc. Therefore, a single value of D will not work well for all links. This is the root cause of the problem with SUERM, as has been demonstrated by both laboratory tests and analysis.

Recently, there has been considerable interest in using 1.5 Mb/sec CCS links. The error monitoring algorithm for such links is known as EIM (errored interval monitor) (see e.g., D.C. Schmidt, "Safe and Effective Error Rate Monitors for SS7 Signaling Links", *IEEE Journal of Selected Areas in Communications*, Vol. 12, No. 3, April 1994, pp. 446–455). EIM is also a leaky-bucket algorithm that operates on time intervals (or slots) rather than individual messages. That is, a slot acts like message for the purposes of error monitoring, which means that if any real message within a slot is errored, the entire slot is considered to be errored. EIM can be regarded as a slotted variant of SUERM. Slotted operation is attractive for high-speed links since it makes the sustainable error rate, and hence optimal D, independent of the message size. As with SUERM, optimal parameter selection for EIM still depends upon other network parameters.

SSCOP was designed specifically for modern high-speed networks which can be characterized by ample bandwidth and very low error rates, and is thus quite different from the CCS protocol. Basically, SSCOP uses selective retransmission of errored messages along with periodic polling of the receiver by the transmitter. Messages are normally referred to as protocol data units or PDUs in SSCOP terminology. SSCOP is described in detail in the ITU document TD PL/11-20C Rev1, "BISDN-ATM Adaptation Layer- Service Specific Connection Oriented Protocol", S. Quinn (ed.), 1993, which is incorporated herein by reference.

All user PDUs in SSCOP carry a sequence number (seqno) for detecting missing PDUs and for delivering them in proper order. The transmitter maintains a counter to keep track of the next seqno to send, and another one for the next seqno to acknowledge. The receiver also maintains two counters: one for the next sequence number expected, and the other for the highest sequence number expected. The latter counter will have a higher value than the former only when some PDUs get lost thereby causing a higher numbered PDU to arrive ahead of a lower number one. In such cases, the receiver alerts the transmitter by sending an unsolicited status message (ustat). The ustat identifies only the latest gap in sequence numbers (not the preexisting ones), and is intended to evoke the retransmission of PDUs in this gap.

The transmitter periodically sends a poll message to the receiver to enquire of its status. In reply, the receiver sends a solicited status (stat) message, which contains a list of all currently existing gaps. The transmitter, in turn, retransmits all missing PDUs. Three buffers are needed on the transmit side to maintain all PDUs. These are a transmit buffer, a retransmit buffer, and a "bag" buffer. The first two are FIFO queues and are used for first-time transmission (user, poll, stat, and ustat PDUs) and user PDU retransmission, respectively. The retransmit queue has a nonpreemptive priority over the transmit queue. The bag contains all unacknowledged PDUs. The purpose of the bag is to retain PDUs so that they will be available for retransmission.

Unlike CCS, there are no FISUs (fill-in signal units) in SSCOP; therefore, no transmission will occur when there is no user traffic. SSCOP is designed to ride on the ATM layer; however, as far as the error monitoring is concerned, this fact is irrelevant.

In a simple 2-node ATM network running SSCOP, two nodes are connected via two unidirectional links (actually, ATM virtual circuits) for forward and backward direction transmission. FIG. 1 shows a pictorial representation of the functional and hardware related activities connected with user PDU transmission in the forward direction. In particular, user PDUs and polls go in the forward direction whereas the corresponding stats and ustats for those PDUs go in the reverse direction. Similar transmissions occur for the other direction as well, but are not shown in order to simplify the figure.

The arriving user PDUs at 101 are placed in the transmit (xmit) buffer 102 and a copy of each (103) is saved in the bag 104 for possible retransmissions. Poll generation is controlled by a programmable poll timer 105. At the end of every polling interval, the poll timer 105 generates a poll and the timer is restarted. Polls (along with stats/ustats for the reverse direction) are also input into the transmit buffer 102. Copies of polls, stats and ustats are not saved since these PDUs are never retransmitted. When a PDU gets to the head of the queue, it is picked up for service by server 106. The PDU is segmented into ATM cells and then transmitted. The transmitted cells suffer propagation delay (108) over the forward ATM link 107. The ATM cells are then received by a receiver 109 on the receiving end of the forward link and assembled into a PDU, which is then checked for errors. If the PDU is uncorrupted, receiver 109 checks its type, which could be user, poll, slat or ustat (the latter two for reverse direction transmissions). An uncorrupted user PDU is placed into the receive buffer 110 for delivery to output 111. Delivery to output 111 may occur immediately if the PDU has the next expected sequence number; otherwise, the PDU is held in the receive buffer 110 until all PDUs with lower sequence number have been received correctly and delivered.

A received uncorrupted poll results in the generation of a stat message by stat generator 112, which lists all the existing sequence number gaps in the receive buffer 110. Finally, uncorrupted stats/ustats (for reverse direction transmissions) result in the retransmission on the reverse link 115 through server 116 of missing PDUs placed in retransmit buffer 114 from a bag (not shown).

All corrupted messages (user, poll, stat, or ustat) are simply discarded at the receiving end of either the forward or reverse links. In the case of a corrupted user PDU, an uncorrupted user PDU will eventually arrive. If this uncorrupted PDU has a sequence number higher than the highest expected sequence number, ustat generator 118 generates a ustat and enters it into the transmit buffer 113 for transmission to the transmitting end of the forward link. The PDUs in the reverse direction also go through the usual process of segmentation (if necessary), transmission on link 115 (having the usual propagation delay 119), and reception, assembly, and error checking by receiver 121. If a stat or ustat PDU is corrupted, it is simply discarded, otherwise, it results in retransmission of missing user PDUs. For this, receiver 121 first locates all desired PDUs in the bag 104, makes a copy (122) of them, and places the copies in the retransmit buffer 123. As stated before, retransmissions get higher priority over transmissions. Thus, server 106 will not serve transmit buffer 102 while there are any PDUs in the retransmit buffer 123 awaiting to be transmitted.

The prior art error monitoring algorithms for CCS cannot be readily adapted for SSCOP. Specifically, the optimal choice of parameters for leaky bucket algorithms such as the previously described SUERM and EIM depend on the sustainable error rate, which is dependent upon the network parameters such as link length, link speed, offered load, error characteristics and message characteristics. In broadband applications these network parameters can vary significantly. Thus link length for terrestrial links may span from zero to about 5000 miles and satellite links may be up to 15,000 miles long. Currently, the link speeds for SSCOP are envisaged to range from 64 Kb/s to 4 Mb/s. In the future, even higher speed links are possible. Errors may come either singly or in bursts of varying severity and duration and the message size distribution may vary widely depending on the application. Because of all of these factors, it is difficult to use one or even a few error monitor parameter sets to cover the entire range of network parameters. Furthermore, these prior art algorithms were designed for situations where FISUs are transmitted when there are no regular user messages to transmit. In the absence of FISUs in SSCOP, the message error probability decreases directly as the traffic decreases. Thus, the prior art algorithm may fail to remove a link from service at low load levels.

Co-pending patent application Ser. No. 08/269,267, filed Jun. 30, 1994 by the inventor herein, now U.S. Pat. No.

5,487,072 issued Jan. 23, 1996, describes an error monitoring algorithm that is not strongly dependent on the network parameters and which further, with a single set of error monitor parameters, covers a wide range of network parameters. That error monitoring algorithm relies on retransmission count monitoring at the transmit end of a link. A quality of service (QOS) factor is computed based on the number of retransmissions needed to get an uncorrupted PDU through to the receive end of the link. The transmitting end of each link is therefore required to store a retransmission count associated with each PDU saved in the transmitter-end bag. Specifically, in accordance with the algorithm described in the co-pending application, at the end of each polling interval a maximum retransmission count of PDUs is determined from amongst those PDUs which were retransmitted in the just completed polling interval. The average maximum retransmission counts over a block of a plurality (N) of consecutive polling intervals is then computed to yield the QOS factor. If the QOS factor exceeds a predetermined threshold, then the link is taken out of service. Disadvantageously, however, this algorithm requires storage of the retransmission counts of all messages, which is not a parameter tracked by the SSCOP protocol. Modification of the SSCOP protocol would, therefore, be required to implement that algorithm.

SUMMARY OF THE INVENTION

An object of the present invention is to monitor error performance with an algorithm that is not strongly dependent on the network parameters using those parameters that are already available in the SSCOP protocol.

An additional object of the present invention is to monitor error performance with an algorithm that covers a wide range of network parameters with only a single set of error monitor parameters.

In accordance with the present invention, a penalty factor is computed at the end of each polling interval. This penalty factor is a function of whether or not a user PDU was retransmitted in the last polling interval, and whether of not a stat message was received by the transmitter within a predetermined number of polling intervals. Specifically, if no message retransmissions occur in the polling interval the penalty factor is set at a first predetermined value such as zero, if there is at least one message retransmission, the penalty factor is set at a higher predetermined value such as one, and if no stat messages are received from the receiver for a predetermined number of polling intervals, the penalty factor is set at an even higher value equal to one less than the number of consecutive polling intervals that comprise a block (N_blk) over which a quality of service (QOS) factor is computed. At the end of each block of N_blk consecutive polling intervals, a QOS measure is determined as the average penalty factor over that block of N_blk polling intervals. If the QOS measure exceeds a predetermined threshold, then the link is taken out of service. If not, the algorithm starts over and performs the same computations over the next block of consecutive polling intervals. For low traffic situations, the algorithm of the present invention further determines over a larger number of polling intervals, the number of lost stats, and if higher than a predetermined number, takes the link out of service.

DETAILED DESCRIPTION

Figure 1:
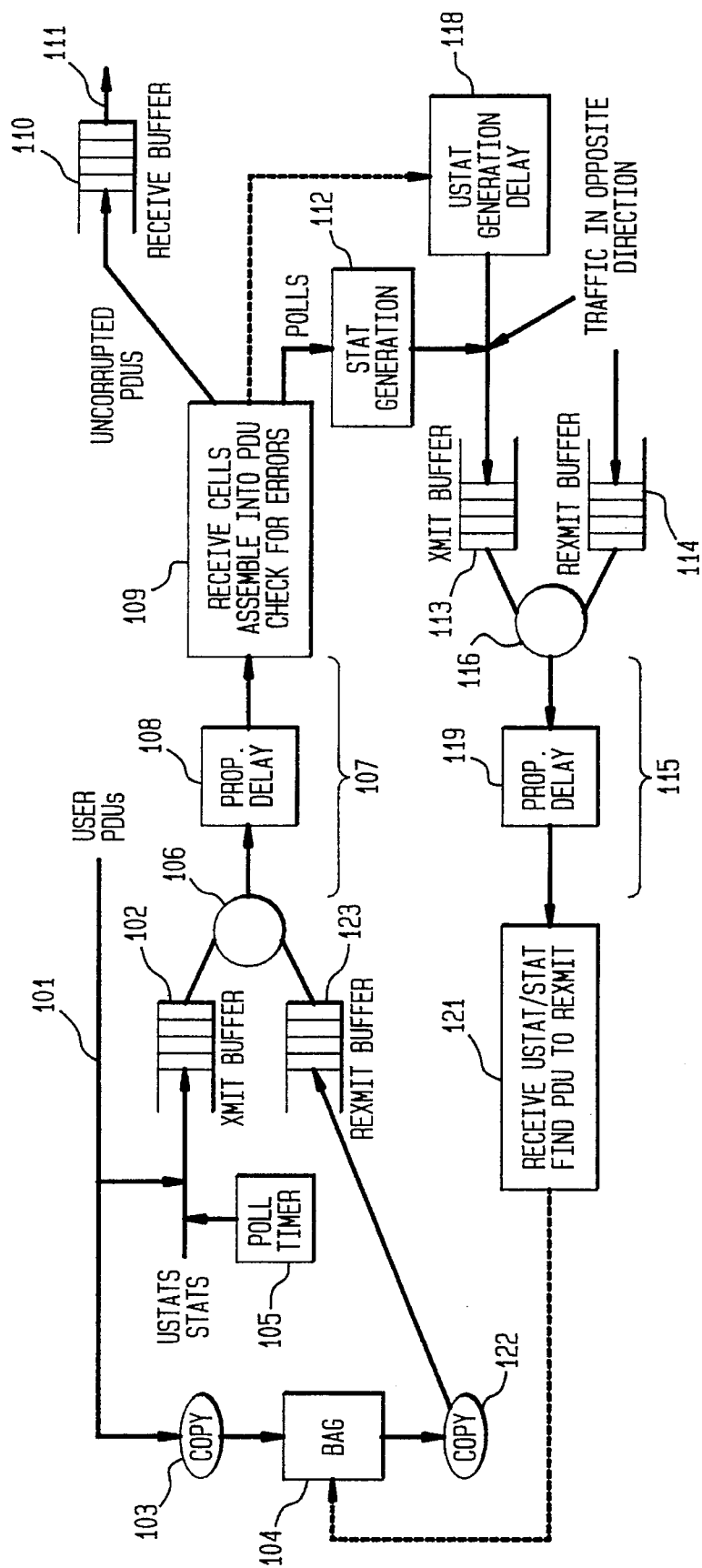
FIG. 1 is a pictorial representation of the functional and hardware related activities connected with user PDU transmission in the forward direction for SSCOP.

As noted above, the error monitoring algorithm of the present invention computes at the transmitting end of a link a QOS measure based on penalty factors that are determined at the end of each polling interval and that are averaged over a block of N_blk consecutive polling intervals. The algorithm uses as triggers the following events that are available from SSCOP: poll generation, PDU retransmission, and the arrival of a slat from the receiver.

At the end of each polling interval, the algorithm enters a monitor phase during which a penalty factor for that interval is determined based on whether or not a PDU has been retransmitted and whether or not a stat has been received in a fixed previous number of polling intervals. Specifically, if no retransmissions occur within a polling interval, a low penalty factor, such as zero, is attributed to the interval; if any retransmissions occur during the interval, a higher penalty factor, such as one, is given the interval; but if, however, no stats have been received over several (N_gap) polling intervals, then an even higher penalty factor, equal to N_blk-1, is attributed to the interval. The use of such a higher penalty factor when several consecutive stats have not been received significantly speeds determination of a link failure and reduces the traffic that must be retrieved when the error burst that led to the failure causes loss of most stats, but not enough to trigger a timer in SSCOP (no-response timer) that measures the time between stats and which removes a link from service if that time exceeds a preset timer period. It also makes the algorithm's performance at very high error rates fairly independent of the no-response timer.

At the end of each block of N_blk consecutive polling intervals, a QOS measure for the block, block_qos, is calculated as the average penalty for the block. That average, block_qos, is clipped at one, for penalty factors of the zero, one, and N_blk-1. This ensures that the use of a higher penalty does not decrease the algorithm's burst tolerance (burst ride-over). Specifically, for a very short severe error burst, it isn't desirable for the link to be taken out of service quickly. Thus, by clipping block_qos to one, the likelihood is decreased that the threshold will be exceeded. At the end of each block, a total block QOS measure, tot_qos, is determined as the weighted combination of the QOS measure, block_qos, calculated based on the penalty factors of the individual polling intervals in the current block, and the total block QOS measure determined at the end of the previous block of N_blk polling intervals. Thus, at the end of each block of N_blk polling intervals, total_qos is defined as: tot_qos=$\alpha$(block_qos)+(1-$\alpha$)tot_qos, where tot_qos on the right side of the equation is equal to the total QOS measure at the end of the previous block. If the computed total QOS measure for the current block, tot_qos, exceeds a predetermined threshold, thres, then the link is taken out of service. The QOS measure computed at the end of each block is thus determined in part by the past history, where the exponential smoothing parameter $\alpha$ determines the extent to which the past history is used to compute the current QOS measure. A smaller $\alpha$ means that the error monitoring algorithm retains past history longer. This tends to reduce variance in the link take-down time and makes the "knee" of the take-down vs. BER curve sharper, both of which are desirable features. However, reducing $\alpha$ also moves the location of the "knee" to a lower BER. Thus, a very small α may take the link out of service quickly at error rates much lower than the "sustainable BER" (i.e., the maximum error rate at which the link can be operated without a significant increase in PDU delays). α will be typically be in the range of 0.1–0.3.

In the absence of user PDUs, the core algorithm described above may become slow to remove the link from service unless the error rate is so high that polls or stats are corrupted with high probability. Some signaling links may be predominately used in alternate routes and, under normal conditions, may have little traffic. It is not advisable to first determine that such an alternate link has an excessive error rate when the normal routes become unusable and traffic is placed on the alternate route. Therefore, a supplementary algorithm based on the traffic that is always on the link, the polls and stats, is incorporated with the aforedescribed algorithm. Specifically, over a superblock of N_sup polling intervals, the number of received stats is accumulated. If the number of received stats is less than the number of transmitted polls by more than a threshold N_loss, the link is taken out of service.

To prevent the error monitor from being influenced by the several "stat-less" polling intervals that occur upon SSCOP connection establishment on a long delay (e.g. satellite) signaling link, the fact that no stat arrived in a polling interval is not taken into account in computing the penalty factor in the basic algorithm or in computing stat loss in the superblock algorithm until after the first stat has been received after the error monitor is initialized.

Figure 2:
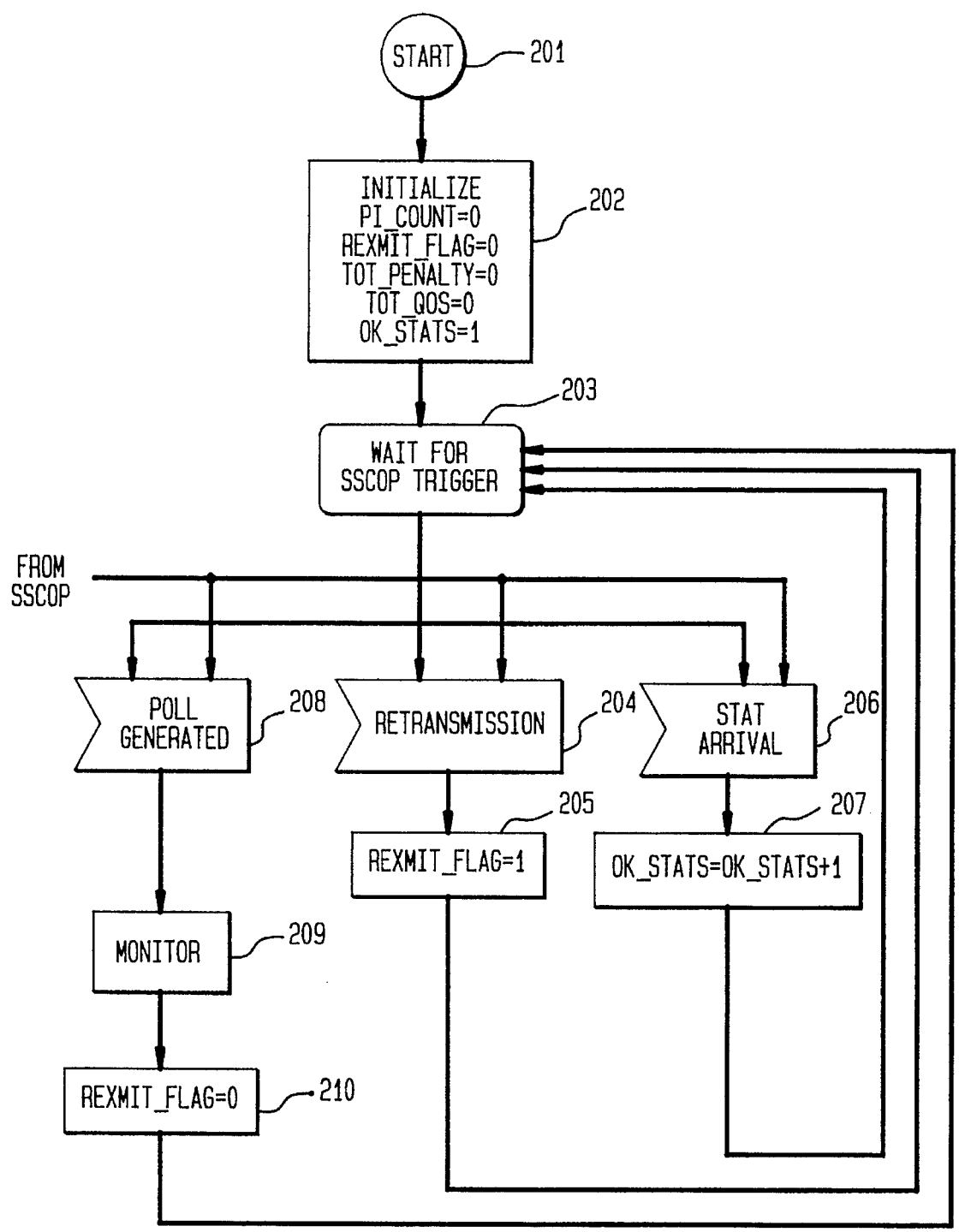
FIGS. 2 and 3 are flowcharts that together detail the algorithm of the present invention.
Figure 3:
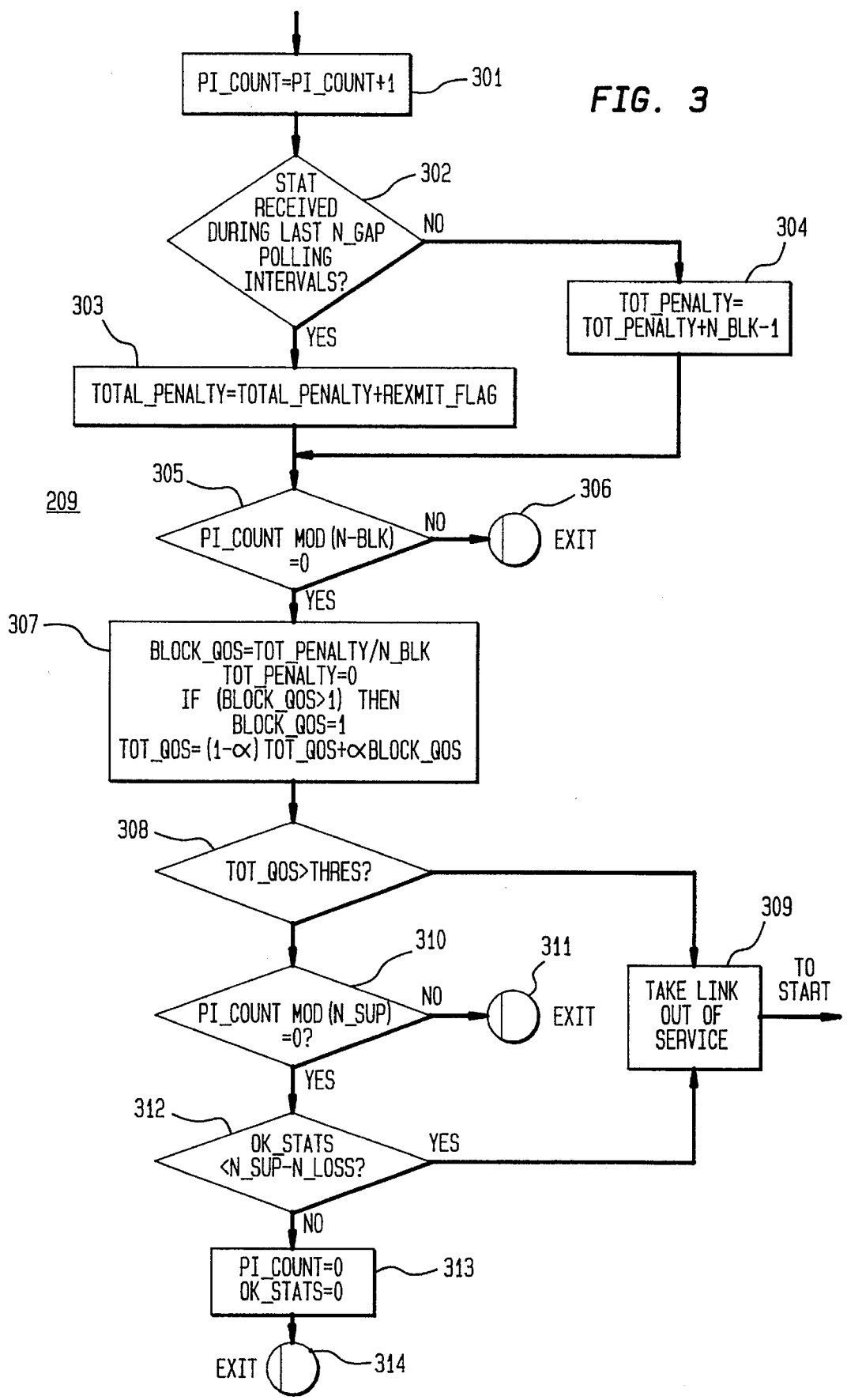

FIGS. 2 and 3 together illustrate in flowchart manner the aforedescribed algorithms. The parameters used in these flowcharts are:

PI_count: The count of polling intervals within a superframe; it is reset to 0 at end of superframe;

rexmit_flag: Flag indicating whether a retransmission has occurred during the polling interval; is set to 1 upon a retransmission trigger from SSCOP, and is reset to 0 at end of each polling interval;

tot_penalty: The accumulated penalty factors within a block of N_blk polling intervals; it is reset to 0 at end of block;

ok_stats: The number of stats received in a superblock; is set to 1 initially to account for lag in routing stat from far end;

N_blk: The fixed number of polling intervals in a block;

N_sup: The fixed number of polling intervals in a superblock;

N_gap: The fixed number of polling intervals over which determination is made whether a stat has been received;

N_loss: The fixed number of stats allowed to be lost within a superblock before a link is removed from service;

block_qos: The average accumulated penalty factor over the block;

α: The exponential smoothing factor;

total_qos: The QOS measure for a block determined from the linear combination of the block_qos and the total_qos of the previous block. thres: The total_qos threshold above which the link is taken out of service.

With reference to FIG. 2, the error monitoring begins at start step 201 upon either system start-up or when a link is returned to operation from a failure condition. At initialization step 202, PI_count, tot_penalty, and tot_qos are set at 0, the rexmit_flag is set to 0, and ok_stats is set to 1, the latter for the reasons aforenoted. The algorithm then waits (step 203) for a SSCOP trigger. Upon a retransmission of a PDU, the retransmission branch is triggered (step 204) and the rexmit_flag is set to 1 (step 205) and processing is returned to the wait step 203. Upon arrival of a stat message, the stat arrival branch is triggered (step 206) and the number of stat messages that have arrived so far the superframe, ok_stats, is incremented by 1 (step 207) and processing is returned to wait step 203. Upon generation of a poll, the poll generation branch is triggered (step 208), which indicates the end of a polling interval. Monitoring processing (step 209) then commences.

The monitoring processing steps are shown in detail in FIG. 3. At the end of the polling interval, the count of polling intervals, PI_count is incremented by 1 (step 301). A penalty factor is then be attributed to that interval. At step 302, determination is made whether any stat was received during the last N_gap polling intervals. If yes, then at step 303, the total accumulated penalty for all the polling intervals within the current block of N_blk polling intervals, tot_penalty, is incremented by the value of the rexmit_flag. The latter is 1 if a retransmission has triggered the retransmission branch in step 204, and is 0 otherwise. If no stats were received during the previous N_gap polling intervals, the accumulated total penalty for the block, tot_penalty, is incremented by N_blk-1 in step 304.

At step 305, determination is made whether the current polling interval is at the end of a block by calculating PI_count mod(N_blk), which equals 0 at the end of each block of N_blk polling intervals. If not at the end of a block, monitoring processing ends at exit 306, and processing returns to the poll generation branch in FIG. 2. Upon exiting, rexmit_flag is reset to 0 at step 210 and the next SSCOP triggering event is awaited at step 203. If the current polling interval is at the end of a block of N_blk polling intervals, at step 307 a QOS measure, block_qos, is calculated as tot_penalty/N_blk and tot_penalty is reset to 0. If block_qos is greater than 1, it is clipped at 1 for the reasons discussed hereinabove. The total QOS measure for the block, tot_qos, based on the aforedescribed combination of block_qos and tot_qos from the previous block is then calculated. If, at step 308, tot_qos is greater than the threshold thresh, the link is taken out of service (step 309). When the link is returned to service, processing returns to start step 201.

If block_qos is less than thresh, then a determination is made whether the current polling interval is at the end of a superframe of N_sup polling intervals. Thus, at step 310 PI_count mod(N_sup) is calculated, which equals 0 at the end of each superblock of N_sup polling intervals. If not at the end of a superframe, monitoring processing ends at exit 311, and processing returns to the poll generation branch in FIG. 2. If the current polling interval is at the end of a superframe, at step 312 the cumulative number of received stats in the superframe, ok_stats, determined at step 207 in FIG. 2, is compared with N_sup–N_loss, to determine how many stats were lost. If ok_stats is less than N_sup–N_loss, the link is taken out of service (step 309). Otherwise, performance is satisfactory and, at step 313, the next superframe is initialized by setting PI_count and ok_stats to 0. Monitoring processing then ends at exit 314 and returns to the poll generation branch in FIG. 2.

Typical parameters that have been used to test the aforedescribed error monitoring algorithm are as follows: N_blk=3, N_sup=1200, N_gap=3, N_loss=13, α=0.1, and thres=0.191. Using computer simulations, the algorithm was found to operate over a wide range of link speeds, link lengths and offered loads. From these simulations, the algorithm has been evaluated with respect to the aspects of link take-down time, PDU delay, transmit congestion, and burst ridcover. The evaluation of the algorithm with respect to these aspects follows.

The link take-down time vs. BER curve for the algorithm was found to have a rather sharp knee that moves appropriately with the link speed, offered load, and message size. The knee always occurs at a BER lower than the sustainable BER for those conditions. For a 4 Mb/sec link at failure mode engineered load (the case where the knee occurs at the lowest BER), the knee occurs at the BER of about 1.0e–7. Although the low-load behavior of the core algorithm is quite good, the auxiliary algorithm ensures that the link is always taken out of service within a few minutes at BERs of 1.0e–5 or higher at any link speed. In all cases, for error rates higher than the sustainable BER, the take-down time quickly drops to the 1–2 second region, which means that PDU delays stay small in the BER region in which they are of interest.

The transmit congestion showed a unimodal behavior, with the maximum typically occurring around 1.0e–3. This error rate is just below the error rate when most of the take-downs will be due to the no-response timer. (The no-response timer was set at 0.8 seconds, which is the appropriate value for riding over a 400 ms error burst.) If the no-response timer is set to a high value, the net effect is similar to that seen under no-response time of 0.9 seconds, since the star-gap mechanism will take the link out of service in 3 blocks at very high error rates. As the error rate decreases below 1.0e–3, so does the congestion. The drop is gradual at first, but by about 2.0e–4, it goes down very substantially. The peak congestion and the BER region over which it stays high generally increase with the message size; however, the increase is not significant unless the link is primarily carrying long messages. In those cases, the congestion may show a significant increase in a narrow BER range (around 4e–4 to 2e–3). However, given that in practice the BER will not stay in such a narrow range, the overall increase in congestion is not very significant.

By analyzing various error burst scenarios, it can be concluded that the burst ride-over is poorest for a heavily loaded high speed link. Consequently, it suffices to test for ride-over using a fully-saturated 4 Mb/sec link. The algorithm rides-over a 300 ms error burst in all cases. With a 400 ms error burst, however, the ride-over probability may drop substantially at a BER of about 4.0e–3, but it recovers very rapidly as the BER increases or decreases. Consequently, the overall probability of failing to ride-over a 400 ms is expected to be negligible.

The error monitoring algorithm of the present invention is intended for use with the SSCOP protocol of the ATM adaptation layer. The algorithm has the desired characteristic that a single set of parameters is adequate for a wide range of link lengths, link speeds, message sizes, offered loads and error characteristics. This makes the algorithm much superior to other known algorithms such as EIM or SUERM since good choices of parameters for those algorithms depend on link and traffic characteristics.

Although described hereinabove in connection with error monitoring of links carrying signaling messages, the present invention could be used for monitoring communication links carrying any types of messages. Further the invention is not limited to use on links using only the SSCOP protocol but could be used in any communications system having characteristics similar to SSCOP in which messages are retransmitted in response to stat messages received from a receiver that indicate lost or missing messages, and which are generated in response to periodic polls from the transmitter.

The above-described embodiment is illustrative of the principles of the present invention. Other embodiments could be devised by those skilled in the art without departing from the spirit and scope of the present invention.

What is claimed is:

1. A method of error monitoring a communications link on which messages are transmitted between a transmitter and a receiver, which transmitter transmits a poll at the end of each periodic polling interval, and which receiver responds to each poll by transmitting to the transmitter a star message indicating which messages have been received in error or not received, and which transmitter retransmits only those messages either received in error or not received by the receiver, comprising the steps of:

(1) at the end of a polling interval, assigning a penalty factor to the interval that is determined as a function of whether or not during the interval the transmitter retransmitted any message, and whether or not any stat messages were received by the transmitter within a predetermined number of polling intervals;

(2) for a block comprising N_blk consecutive polling intervals, computing the average penalty factor;

(3) comparing a quality of service (QOS) measure equal to the average penalty factor for the block with a predetermined threshold; and (4) removing the link from service if the QOS measure for the block is greater than the predetermined threshold.

2. The method of claim 1 wherein each of the steps is repeated for successive blocks of N_blk polling intervals.

3. The method of claim 2 wherein the QOS measure is determined at the end of a current block of polling intervals as a weighted combination of the average penalty factor of the current block and the QOS measure of a previous block.

4. The method of claim 3 wherein step (1) comprises the steps of:

(a) assigning a penalty factor of a first predetermined value if the transmitter retransmits no messages during the interval;

(b) assigning a penalty factor of a second predetermined value higher than said first predetermined value if the transmitter transmits at least one message during the interval; and (c) assigning a penalty factor of a third predetermined value higher than said first predetermined value if no stat messages are received from the receiver for a predetermined number of polling intervals.

5. The method of claim 4 wherein the first predetermined value is zero, the second predetermined number is one, and the third predetermined number is equal to N_blk-1.

6. The method of claim 5 wherein in step (2) the computed average penalty factor for the block is clipped at one.

7. The method of claim 4 further comprising the steps of determining the number of stat messages transmitted by the receiver and not received by the transmitter within a superblock of N_sup polling intervals, where N_sup is substantially higher than N_block, and removing the link from service if the number of stat messages not received within the superblock is greater than a second predetermined threshold.

8. The method of claim 1 wherein the link is on an ATM network.

9. The method of claim 8 wherein the messages are signaling messages.

10. The method of claim 9 wherein the signaling messages are transmitted under a service specific connection oriented protocol (SSCOP).

11. A method of error monitoring a digital communications link on which messages are transmitted between a transmitter and a receiver, which transmitter transmits a poll at the end of each periodic polling interval, and which receiver responds to each poll by transmitting to the transmitter a stat message indicating which messages have been received in error or not received, and which transmitter retransmits only those messages either received in error or not received by the receiver, comprising the steps of:

(1) at the end of a polling interval, assigning a penalty factor to the interval that is determined as a function of whether or not during the interval the transmitter retransmitted any message, and whether or not any stat messages were received by the transmitter within a predetermined number of polling intervals;

(2) for a block comprising N_blk consecutive polling intervals, computing the average penalty factor;

(3) comparing a quality of service (QOS) measure equal to the average penalty factor for the block with a predetermined threshold; and (4) removing the link from service if the QOS measure for the block is greater than the predetermined threshold.

12. The method of claim 11 wherein each of the steps is repeated for successive blocks of N_blk polling intervals.

13. The method of claim 12 wherein the QOS measure is determined at the end of a current block of polling intervals as a weighted combination of the average penalty factor of the current block and the QOS measure of a previous block.

14. The method of claim 13 wherein step (1) comprises the steps of:

(a) assigning a penalty factor of a first predetermined value if the transmitter retransmits no messages during the interval;

(b) assigning a penalty factor of a second predetermined value higher than said first predetermined value if the transmitter transmits at least one message during the interval; and (c) assigning a penalty factor of a third predetermined value higher than said first predetermined value if no stat messages are received from the receiver for a predetermined number of polling intervals.

15. The method of claim 14 wherein the first predetermined value is zero, the second predetermined number is one, and the third predetermined number is equal to N_blk-1.

16. The method of claim 15 wherein in step (2) the computed average penalty factor for the block is clipped at one.

17. The method of claim 14 further comprising the steps of determining the number of stat messages transmitted by the receiver and not received by the transmitter within a superblock of N_sup polling intervals, where N_sup is substantially higher than N_block, and removing the link from service if the number of stat messages not received within the superblock is greater than a second predetermined threshold.

18. The method of claim 11 wherein the link is on an ATM network.

19. The method of claim 18 wherein the messages are signaling messages.

20. The method of claim 19 wherein the signaling messages are transmitted under a service specific connection oriented protocol (SSCOP).

* * * * *